United States Patent [19]

Tamura

[11] Patent Number: 4,539,821
[45] Date of Patent: Sep. 10, 1985

[54] CAPACITY CONTROL DEVICE FOR CONTROLLING A VARIABLE DISPLACEMENT COMPRESSOR IN AN AIR CONDITIONING SYSTEM

[75] Inventor: Yasuji Tamura, Ojima, Japan
[73] Assignee: Sanden Corporation, Gunma, Japan
[21] Appl. No.: 682,500
[22] Filed: Dec. 18, 1984

Related U.S. Application Data

[63] Continuation of Ser. No. 468,329, Feb. 22, 1983, abandoned.

[30] Foreign Application Priority Data

Feb. 20, 1982 [JP] Japan .................................. 57-25251

[51] Int. Cl.³ ............................................... F25B 1/00
[52] U.S. Cl. .............................. 62/228.5; 236/1 EA; 307/39
[58] Field of Search ................. 62/175, 228.5; 307/39; 236/1 EA, 1 ER; 165/26

[56] References Cited

U.S. PATENT DOCUMENTS

| | | | |
|---|---|---|---|
| 2,556,882 | 6/1951 | Minkler et al. | 62/228.5 |
| 4,379,483 | 4/1983 | Farley | 236/1 EA |
| 4,379,484 | 4/1983 | Lom et al. | 236/1 EA |
| 4,471,632 | 9/1984 | Nishi et al. | 62/208 |

FOREIGN PATENT DOCUMENTS

WO81/00446  2/1981  PCT Int'l Appl. .............. 236/1 EA

Primary Examiner—William E. Wayner
Attorney, Agent, or Firm—Banner, Birch, McKie & Beckett

[57] ABSTRACT

A capacity control device for a variable displacement compressor in a refrigerating or air conditioning system is disclosed. The capacity control device controls the operation of a variable displacement device having two variable displacement valves for changing the capacity of the compressor as a function of the required refrigerating capacity of the air conditioning system. The capacity control device determines whether the compressor should operate at a high, medium or low capacity. If the required refrigerating capacity is smaller than the current capacity of the compressor, the capacity control device actuates the variable displacement device to enable the compressor to operate at a lower capacity. If the required refrigerating capacity is larger than the current capacity of the compressor, the capacity control device actuates the variable displacement device to enable the compressor to operate at a larger capacity. The capacity control device includes a temperature detector and a timing circuit responsive to the current temperature of the air generated by the air conditioning system to generate a plurality of output signals which ultimately control the two varible displacement valves to change the capacity of the compressor from high to medium to low and vice versa.

12 Claims, 8 Drawing Figures

CAPACITY CONTROL DEVICE FOR CONTROLLING A VARIABLE DISPLACEMENT COMPRESSOR IN AN AIR CONDITIONING SYSTEM

This application is a continuation of application Ser. No. 468,329, filed Feb. 22, 1983, now abandoned.

BACKGROUND OF THE INVENTION

This invention relates generally to a device for controlling the operation of an air conditioning system, and more particularly, to an electronic capacity control circuit for a variable displacement compressor in an automobile air conditioning system.

In conventional air conditioning systems known in the prior art, the air conditioning compressor is driven by a motor, either directly or through a magnetic clutch. Thermal control in the room or compartment is accomplished by the intermittent operation of the magnetic clutch or motor by a signal from a thermostat disposed in the room. Once the temperature in the room is lowered to the desired level, the supplemental cooling capacity of the air conditioner need not be as large for maintaining the desired temperature in the room. Therefore, after the room has been cooled to the desired temperature, conventional air conditioning compressors are intermittently operated in response to the thermostat signal. Compressors having large cooling capacities are operated even more intermittently because of the high amounts of energy required to drive such compressors.

In an air conditioning system for automobiles, the compressor is usually driven by the automobile engine. Because the r.p.m. of the automobile engine changes continuously, the rotation frequency of the compressor changes accordingly, resulting in rapid changes in the cooling capacity of the air conditioner. Automobile air conditioners are generally designed so that when the compressor is driven by the engine at normal driving speeds, the air conditioner operates at optimum capacity. Therefore, when the compressor is driven by the engine at lower operating speeds, or when the engine is idling, the cooling capacity of the air conditioner is insufficient to maintain adequate cooling of the vehicle. Conversely, when the compressor is driven at high operating speeds by the engine, cooling capacity is more than necessary.

One known device for controlling the excessive cooling capacity of air conditioning systems operates by reheating some of the cooled air generated by the air conditioner. Part of the air from the evaporator of the air conditioner is reheated in a heating unit. The reheated air is mixed with the remaining cooled air to control the temperature of the air which is ultimately blown into the room or compartment. In this device, the ratio of cooling capacity to heating capacity is controlled in response to the r.p.m. of the automobile engine. The above described device for controlling air temperature is complicated and considerable energy is wasted in reheating the cooled air.

In another known device for controlling the cooling capacity of an air conditioning system, the magnetic clutch connecting the compressor to the driving engine or motor is intermittently operated to control the operation of the compressor. However, because the magnetic clutch is often required to engage the driving engine at high operating speeds, sudden and deleterious forces are generated at the moment the clutch is engaged and are transmitted to the engine and compressor. The temperature of the air which is blown into the room or compartment also drastically changes upon engagement of the clutch and operation of the compressor.

SUMMARY OF THE INVENTION

It is the overall object of this invention to provide a control circuit for controlling the cooling capacity of an air conditioning system.

A specific object of this invention is to provide a control circuit for a variable displacement compressor in an air conditioning system which controls the cooling capacity of the air conditioning compressor.

Another specific object of this invention is to provide a control circuit for a variable displacement compressor in an air conditioning system which controls the cooling capacity of the air conditioning compressor as required by the cooling load.

A still further specific object of this invention is to provide a control circuit for a variable displacement compressor in an air conditioning system which controls the cooling capacity of the air conditioning compressor to eliminate or reduce the generation of sudden and deleterious forces when the compressor engages the driving device.

Another specific object of this invention is to provide a control circuit for a variable displacement compressor in an air conditioning system which improves the performance and efficiency of the air conditioning system.

The present invention is directed to a device for controlling the cooling capacity of a compressor in an air conditioning system. The compressor includes a variable displacement device for changing the cooling capacity of the compressor. The variable displacement device is controlled by the cooling capacity control device to change the cooling capacity of the compressor as required by the cooling load. As a result, the temperature in the room is kept at the desired level much more efficiently.

The further objects, features and aspects of this invention will be understood from the following detailed description of the preferred embodiments of this invention referring to the annexed drawings.

DETAILED DESCRIPTION OF THE PREFERRED EMBODIMENTS

Figure 1:
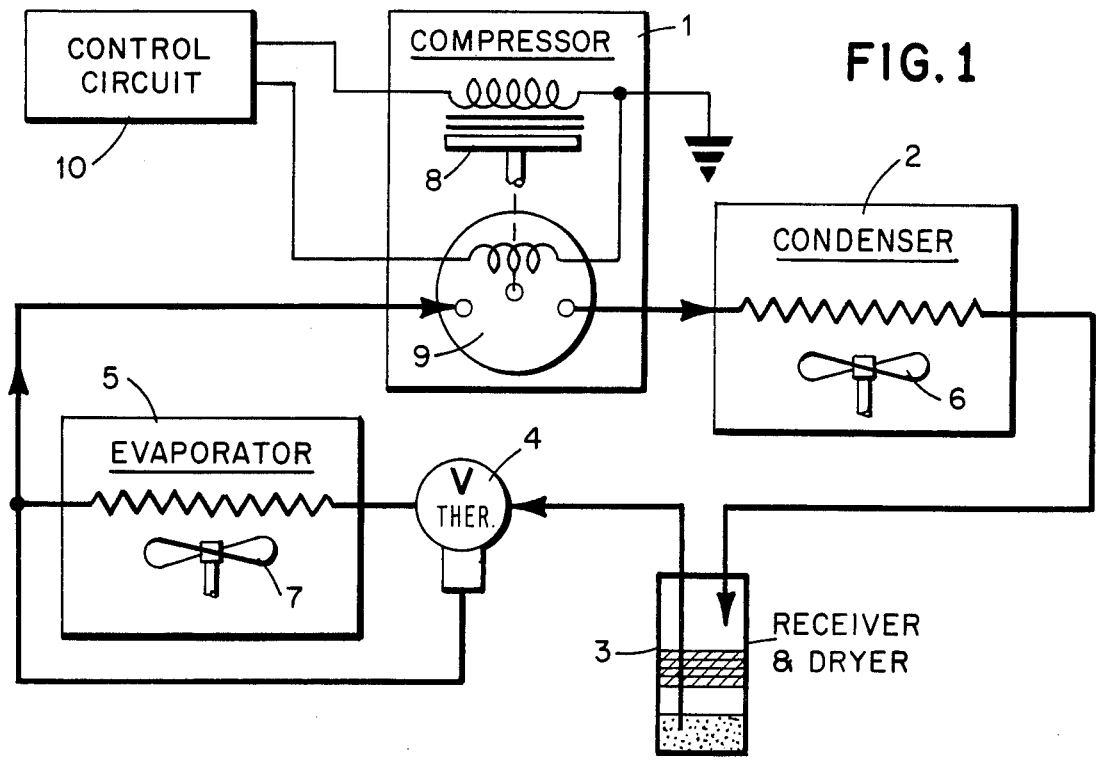
FIG. 1 is a schematic diagram of an air conditioning or refrigerating system in accordance with this invention.

Referring to FIG. 1, the basic construction of a refrigeration or air conditioning system, particularly an automobile air conditioning system, is diagrammatically shown. The air conditioning system comprises a compressor as generally indicated by reference number 1. Compressor 1 includes magnetic clutch 8 and variable displacement device 9 which are controlled by control circuit 10 as will be explained in greater detail below. The air conditioning system shown in FIG. 1 further comprises condensor 2 and its associated fan 6, receiver and dryer 3, thermostatic expansion device or valve 4 and evaporator 5 and its associated fan 7. These basic components are coupled in series to form a conventional refrigeration circuit. Refrigerant gas is compressed in compressor 1 and supplied to condenser 2 where it is condensed to liquid refrigerant and cooled by forced ventilation of fan 6. The liquid refrigerant is accumulated in receiver and dryer 3, which removes the moisture and metal chips from the liquid refrigerant. The liquid refrigerant within the receiver and dryer 3 is delivered to thermostatic expansion valve 4. The refrigerant expands as it flows through valve 4 and emerges as a two-part mixture of liquid and gas, but primarily liquid. As the mixture flows through evaporator 5, which acts as a heat exchanger in conjunction with blower 7, which supplies air to the vehicle compartment, heat is transferred from the incoming air to the refrigerant and the entirety of the refrigerant vaporizes to a gaseous state. The refrigerant gas at the evaporator outlet is then passed to the suction inlet of compressor 1.

Compressor 1 is controlled by the operation of magnetic clutch 8 and variable displacement device 9. Magnetic clutch 8 is used to engage the compressor driving means and variable displacement device 9 is used for changing the cooling capacity of the compressor, both being controlled by the operation of control circuit 10 as will be described in further detail below.

Figure 2:
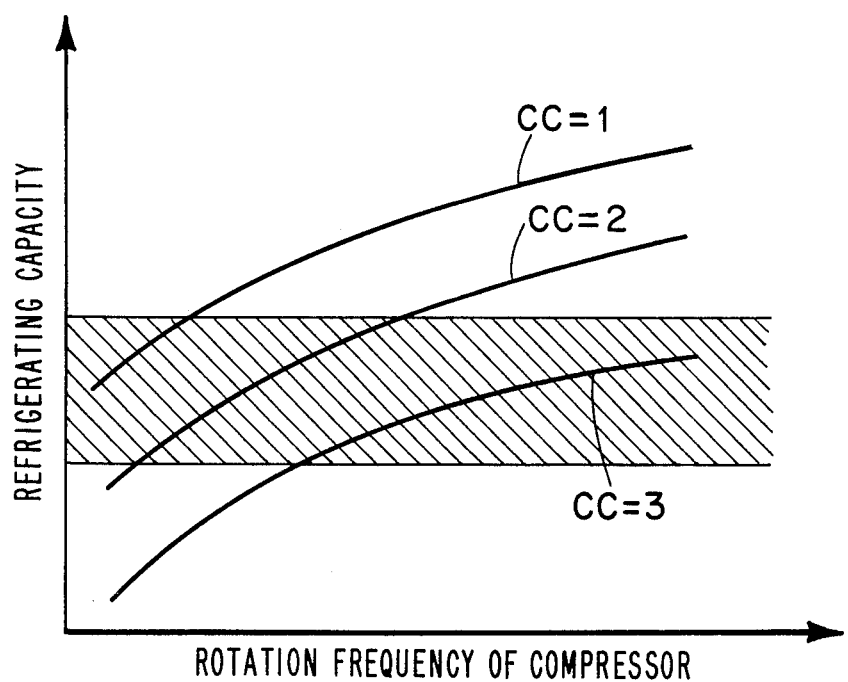
FIG. 2 is a graph of the refrigerating or cooling capacities of a variable displacement compressor which is used in the refrigerant circuit of FIG. 1.

Variable displacement device 9 may be used to change the cooling capacity of compressor 1 to one of three levels, i.e., $CC_1$, $CC_2$ or $CC_3$, as shown in FIG. 2. FIG. 2 illustrates the relationship of cooling capacity to rotation frequency of the compressor.

In the preferred embodiment, compressor 1 is a scroll type compressor including a variable displacement device 9 as shown in U.S. Pat. Nos. 4,468,178 and 4,514,150. Compressor 1 is controlled by operation of magnetic clutch 8 which controls the operation thereof and the variable displacement device 9 which changes the cooling capacity of the compressor. Magnetic clutch 8 and variable displacement device 9 are controlled by operation of control circuit 10, which is described in further detail below in connection with FIG. 3.

Figure 3:
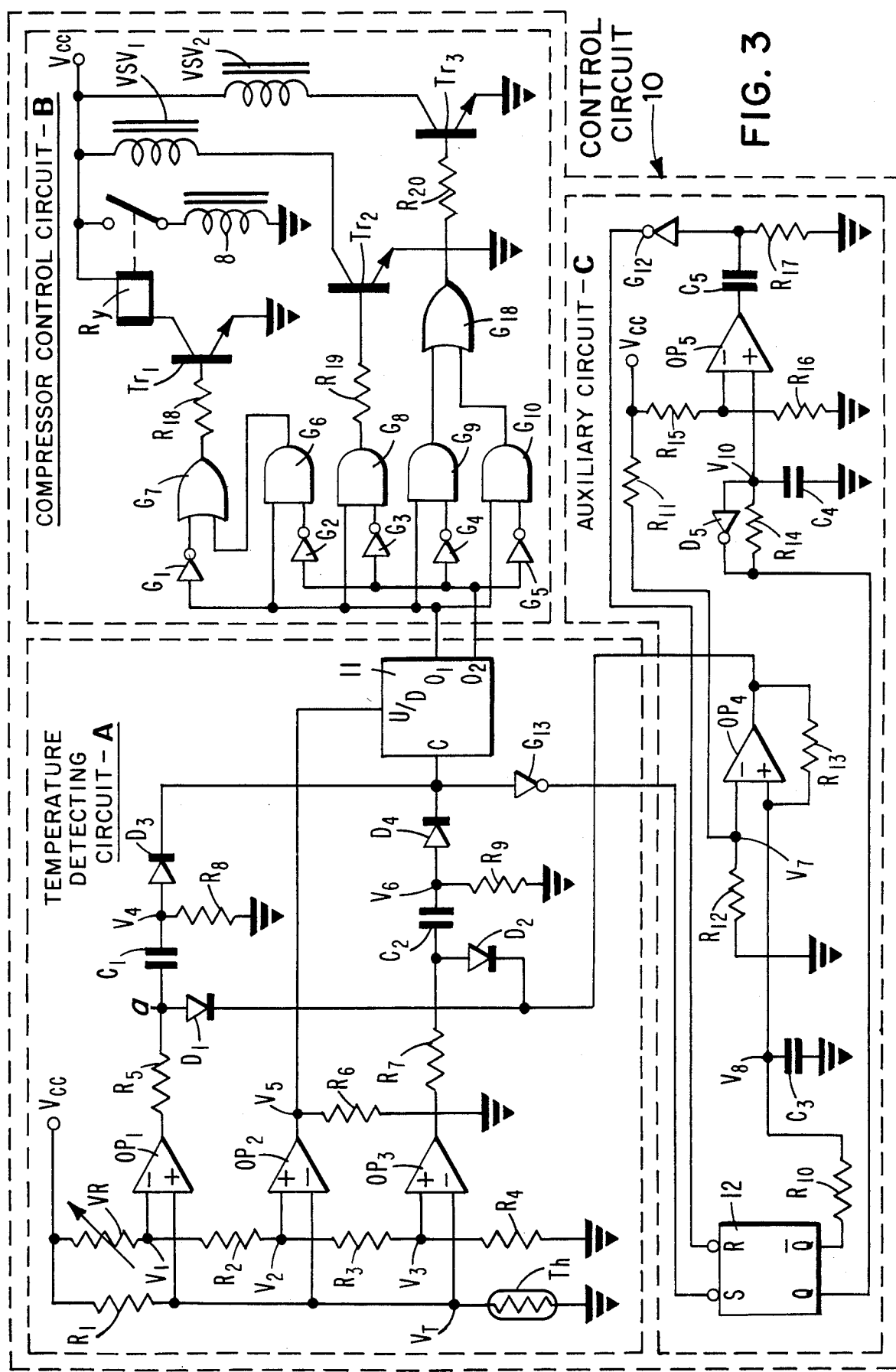
FIG. 3 is a circuit diagram of an embodiment of a capacity control device for the compressor of FIG. 1.

As mentioned above, compressor 1 includes variable displacement device 9 which is capable of changing the cooling capacity of the compressor. The capacity of the compressor shown in FIG. 1 can be changed to one of three conditions, i.e., $CC_1$, $CC_2$ or $CC_3$, as shown in FIG. 2. Variable displacement device 9 of compressor 1 includes at least one valve as shown in U.S. Pat. Nos. 4,468,178 and 4,514,150. This valve is controlled by a solenoid. In the embodiment of the present invention, variable displacement device 9 of compressor 1 has two valves and two solenoids $VSV_1$ and $VSV_2$ as shown in FIG. 3. Solenoids $VSV_1$ and $VSV_2$ are connected to voltage source Vcc through control circuit 10.

The relationship between the operation of solenoids $VSV_1$ and $VSV_2$ and the cooling capacity of compressor 1 as shown in FIG. 2, is given in Table I below:

TABLE I

|  | VSV1 | VSV2 | Reduction ratio of compressed volume |
|---|---|---|---|
| CC1 | closed | closed | 100% |
| CC2 | closed | open | 70% |
| CC3 | open | open | 40% |

Referring to FIG. 3, a circuit diagram of control circuit 10 for controlling the operation of magnetic clutch 8 and variable displacement device 9 of compressor 1 is shown. The control circuit includes a temperature detecting circuit A which detects the temperature of blown air from evaporator 5. The detected temperature is compared with predetermined temperature levels to generate signals for controlling magnetic clutch 8 and variable displacement device 9 through the operation of solenoids $VSV_1$ and $VSV_2$ as shown in circuit B. Temperature detecting circuit A includes temperature sensing thermistor Th and comparators $OP_1$, $OP_2$ and $OP_3$. Thermistor Th is mounted on the air outlet of evaporator 5 for detecting the temperature of the blown air. In detecting circuit A, reference voltages $V_3$ and $V_1$ are set by variable resistor VR through voltage divider network $R_2$, $R_3$ and $R_4$ in accordance with predetermined temperatures Tu and Td. Reference voltages $V_3$ and $V_1$ establish the upper temperature (Tu) and lower temperature (Td) levels of the air blown from evaporator 5 at which the outputs of comparators $OP_3$ and $OP_1$ change voltage levels, respectively.

The output of comparators $OP_1$ and $OP_3$ are coupled to clock terminal C of up/down counter 11 via respective coupling networks. The coupling network of $OP_1$ includes resistors $R_5$ and $R_8$, diodes $D_1$ and $D_3$ and capacitor $C_1$. The coupling network of $OP_3$ similarly includes resistors $R_7$ and $R_9$, diodes $D_2$ and $D_4$ and capacitor $C_2$. Capacitors $C_1$ and $C_2$ of each respective coupling network convert the high voltage output signals of comparators $OP_1$ and $OP_3$ to a pulse signal which is used to drive clock terminal C of counter 11. Output voltage $V_5$ of comparator $OP_2$ is coupled to the up/down terminal input of counter 11 and determines whether counter 11 counts in an upward or a downward direction in response to the pulse signals from capacitors $C_1$ and $C_2$. When the up/down terminal of counter 11 is at a high voltage level, counter 11 counts in an upward direction and when the up/down terminal is at a low level, counter 11 counts in a downward direction. Resistor $R_6$ at the output of comparator $OP_2$ provides the proper biasing for the up/down terminal of counter 11. The output of counter 11 is provided at output terminals $O_1$ and $O_2$ in binary format.

In this embodiment of the invention, reference voltage $V_2$ of compartor $OP_2$ is set between reference voltages $V_1$ of comparator $OP_1$ and reference voltage $V_3$ of comparator $OP_3$. Therefore, when the output of comparator $OP_1$ is at a high voltage level, the output of comparator $OP_2$ is also at a high voltage level. Accordingly, the pulse signal generated by the changing of the output voltage level of comparator $OP_1$ is counted in the upward direction by counter 11 while the pulse signal generated by the changing of the output voltage level of comparator $OP_3$ is counted in the downward direction since the voltage level of the up/down terminal of counter 11 is then at a low state.

Control circuit 10 further includes logic circuit B for controlling the operation of magnetic clutch 8 and solenoids $VSV_1$ and $VSV_2$ in accordance with the outputs of counter 11. The operation of magnetic clutch 8 is controlled by the operation of relay Ry. Relay Ry is connected to the collector of NPN type transistor $Tr_1$ which is in turn connected in series with magnetic clutch 8. When transistor $Tr_1$ conducts, relay $R_4$ is energized so that magnetic clutch 8 actuates compressor 1. The base of transistor $Tr_1$ is connected to counter 11 via a logic circuit including OR gate $G_7$, AND gate $G_6$ and converters $G_1$ and $G_2$. Resistor $R_{18}$ is connected between the base of transistor $Tr_1$ and OR gate $G_7$ to provide proper biasing.

The operation of solenoids $VSV_1$ and $VSV_2$ is controlled by NPN type transistors $Tr_2$ and $Tr_3$. The collector of each transistor is connected in series with solenoids $VSV_1$ and $VSV_2$, respectively. When transistor $Tr_2$ and $Tr_3$ conducts, solenoids $VSV_1$ and $VSV_2$ actuate valves in variable displacement device 9 for changing the displacement of compressor 1. The base of transistor $Tr_2$ is coupled to counter 11 via AND gate $G_8$ and inverter $G_3$. The base of transistor $Tr_1$ is coupled to counter 11 via OR gate $G_{11}$, AND gates $G_9$ and $G_{10}$ and inverters $G_4$ and $G_5$. Resistors $R_{19}$ and $R_{20}$ provide proper biasing for transistors $Tr_2$ and $Tr_3$, respectively.

The operation of magnetic clutch 8 and solenoids $VSV_1$ and $VSV_2$ is in accordance with the outputs $O_1$ and $O_2$ of counter 11 as shown below in Table II where "0" represents a low level voltage output and "1" represents a high level voltage output.

TABLE II

| output terminal | | solenoid | | clutch | Reduction ratio of |
| --- | --- | --- | --- | --- | --- |
| O1 | O2 | VSV1 | VSV2 | Mg | compressed volume |
| 0 | 0 | closed | closed | ON | 100% |
| 0 | 1 | closed | open | ON | 70% |
| 1 | 0 | open | open | ON | 40% |
| 1 | 1 | closed | closed | OFF | 0% |

In control circuit 10, a pulse signal at terminal C of counter 11 is generated by the output of comparator $OP_1$ when temperature Te of the blown air at evaporator 5, as detected by thermistor Th, decreases from a high level to predetermined lower temperature level Td. This pulse signal changes the count of counter 11 which ultimately reduces the capacity of the compressor by operation of circuit B. Likewise a pulse signal is generated at terminal C of counter 11 by the output of comparator $OP_3$ when temperature Te increases to upper predetermined temperature level Tu in response to the reduction in compressor capacity described above. Thus, the cooling capacity of compressor 1 can be continuously controlled by these two pulse signals.

Control circuit 10 also includes auxiliary circuit C which is responsive to the pulse signal generated by the outputs of comparators $OP_1$ and $OP_3$ through inverter $G_{13}$. The minimum cooling capacity or compression volume of compressor 1 for keeping the desired temperature of a room or compartment is determined by auxiliary circuit C. Circuit C includes RS flip-flop 12 with outputs Q and $\overline{Q}$ connected to comparators $OP_4$ and $OP_5$ via respective coupling networks $R_{10}$ and $C_3$ and $D_5$, $R_{14}$ and $C_4$. Resistors $R_{11}$, $R_{12}$ and $R_{13}$ establish reference voltage $V_7$ for comparator $OP_4$ and resistors $R_{15}$ and $R_{16}$ establish reference voltage $V_9$ for comparator $OP_5$. The output of comparator $OP_5$ is coupled via capacitor $C_5$ and resistor $R_{17}$ to the reset terminal of flip-flop 12 through inverter $G_{12}$. The output of comparator $OP_4$ is coupled to the cathodes of diodes $D_1$ and $D_2$ of circuit A.

Figure 4:
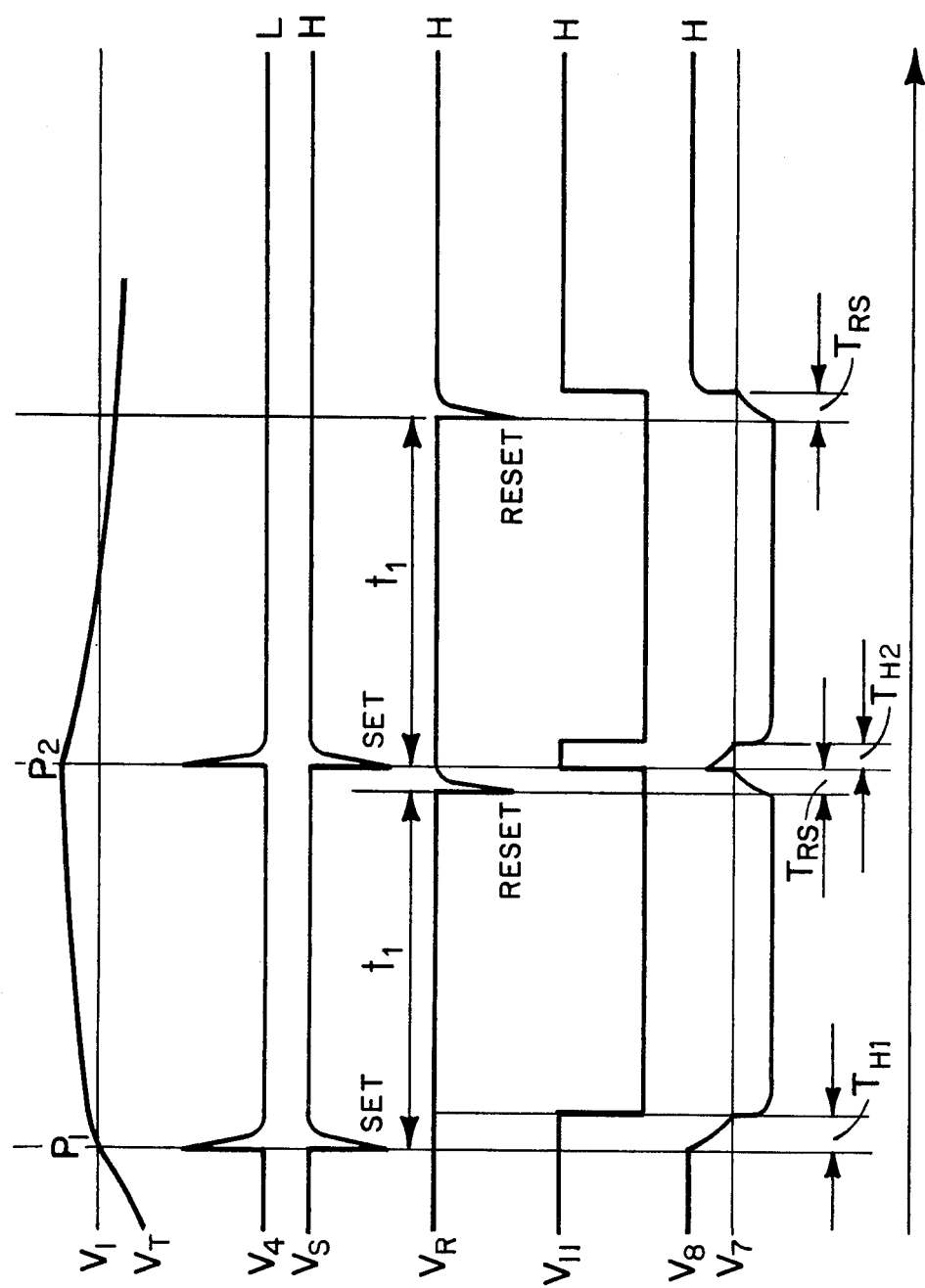
FIG. 4 illustrates the waveforms of the signals at several points in the circuit of FIG. 3.

The operation of auxiliary circuit C will be described with reference to FIGS. 3 and 4. When the air conditioner is first started, temperature Te of the blown air in evaporator 5 is high so that voltage $V_T$, which is inversely related to temperature Te, is lower than reference voltage $V_3$ applied to the non-inverting input terminal (+) of comparator $OP_3$. The output of comparator $OP_3$ is at a high voltage level and the outputs of comparators $OP_1$ and $OP_2$ are at a low voltage level. During this initial state, compressor 1 is driven with large cooling capacity or volume $CC_1$ as shown in FIG. 2 so that the desired room temperature is quickly reached. Voltage $V_T$ then increases in accordance with the lowering of temperature Te of the blown air as shown in FIG. 4. As the operation of the air conditioner continues, voltage $V_T$ continues to increase in response to decreasing temperature Te. Voltage $V_T$ rises above voltage $V_3$ and $V_2$ and finally reaches voltage $V_1$ which is related to lower predetermined temperature level Td and is shown as Point $P_1$ in FIG. 4. When this occurs, the output voltage of comparator $OP_1$ changes to a high voltage level. As a result, a pulse signal is generated by capacitor $C_1$ and is provided to clock terminal C of counter 11. This pulse signal is shown as $V_4$ in FIG. 4. Because counter 11 is in the up-count mode by virtue of the output of comparator $OP_2$ being at a high voltage level, the voltage of output terminal $O_2$ of counter 11 changes to a high voltage level as shown in Table II. Thus, the compression volume of compressor 1 is changed from large volume $CC_1$ to middle volume $CC_2$ as also shown in Table II.

The pulse signal which is generated by capacitor $C_1$ is inverted by inverter $G_{13}$, as shown by waveform $V_s$ in FIG. 4, and is input to set terminal S of flip-flop circuit 12. During this period of time, the voltage at point a of the output line of comparator $OP_1$ is held to a low voltage level for a predetermined time delay $t_1$, e.g., five seconds. Delay $t_1$ is established by comparator $OP_4$ and a timer circuit which includes comparator $OP_5$. Prior to pulse $V_s$ being applied to terminal S of flip-flop 12, flip-flop 12 is in a reset condition with output terminal $\overline{Q}$ held to a high voltage level and output terminal Q held to a low voltage level. Therefore, output voltage $V_{11}$ of comparator $OP_4$ is at a high level and the output voltage of comparator $OP_5$ is at a low level. When pulse signal $V_s$ is applied to terminal S of flip-flop 12, the voltage levels of outputs Q and $\overline{Q}$ change to high and low, respectively. After time delay $t_1$, which is established by a time constant circuit comprising capacitor $C_3$ and resistor $R_{10}$, output voltage $V_{11}$ of comparator $OP_4$ changes to a low level. The presence of time delay $t_1$ prevents the changing of output voltage $V_{11}$ of comparator $OP_4$ from interfering with the pulse signal present a point a of the output line of comparator $OP_1$ when its output changes from a low to a high voltage level.

After time delay $t_1$, the output voltage of comparator $OP_5$ changes to a high level and a reset signal is generated by capacitor $C_5$, shown as VR in FIG. 4, and is provided to reset the terminal R of flip-flop circuit 12 via inverter $G_{12}$. Accordingly, flip-flop 12 is reset to the state where output terminal $\overline{Q}$ is at a low voltage level and output terminal Q is at a high voltage level. Output voltage $V_{11}$ of comparator $OP_4$ also changes to a high voltage level after time delay $t_1$.

When output voltage $V_{11}$ of comparator $OP_4$ changes to a high voltage level, the voltage level at point a—which was kept at a low level by the previously low output of comparator $OP_4$ in spite of the high output level of comparator $OP_1$— is changed to a high voltage level. Therefore, another pulse signal is generated by capacitor $C_1$ and is provided to clock terminal C of counter 11. Because counter 11 is still in the up count mode, the output of counter 11 reflects a binary count of 2 where terminal $O_2$ is at a low level and terminal $O_1$ is at a high level. The cooling capacity or volume of compressor 1 is thus lowered to a 40% ratio as shown in Table II.

The pulse signal generated at capacitor $C_1$ by output voltage $V_{11}$ of comparator $OP_4$ changing to a high voltage level is also fed to terminal S of flip-flop 12. The operation of auxiliary circuit C is thereafter repeated as above described. However, after point $P_2$ of FIG. 4 is passed, i.e., temperature Te of the blown air increases due to a reduction of the cooling capacity of compressor 1, voltage $V_T$ gradually decreases as shown in FIG. 4. Therefore, if the output of $OP_2$ is changed to a low voltage level for predetermined time delay $t_1$ due to the decrease of voltage $V_T$, the upcounting pulse signal is not generated so that counter 11 is reset for receiving a down counting pulse signal.

In this situation, as temperature Te increases to upper temperature level Tu, the output of comparator $OP_3$ is changed to a high voltage level due to the decrease of voltage $V_T$ and a pulse signal is generated by capacitor $C_6$ and input to clock terminal C of counter 11. At this time, while up/down terminal of counter 11 is at a low state, the pulse signal generated by the output of comparator $OP_3$ is counted as a down count. Thus, output terminals $O_1$, $O_2$ of counter 11 are changed, i.e., terminal $O_1$ is low and terminal $O_2$ is high. The cooling capacity of compressor 1 is increased as mentioned above with reference to Table II.

The above description explains the situation where variable displacement device 9 operates continuously to maintain the temperature around lower temperature Td. The continuous operation around higher temperature Tu can also be accomplished in a similar manner.

Figure 5:
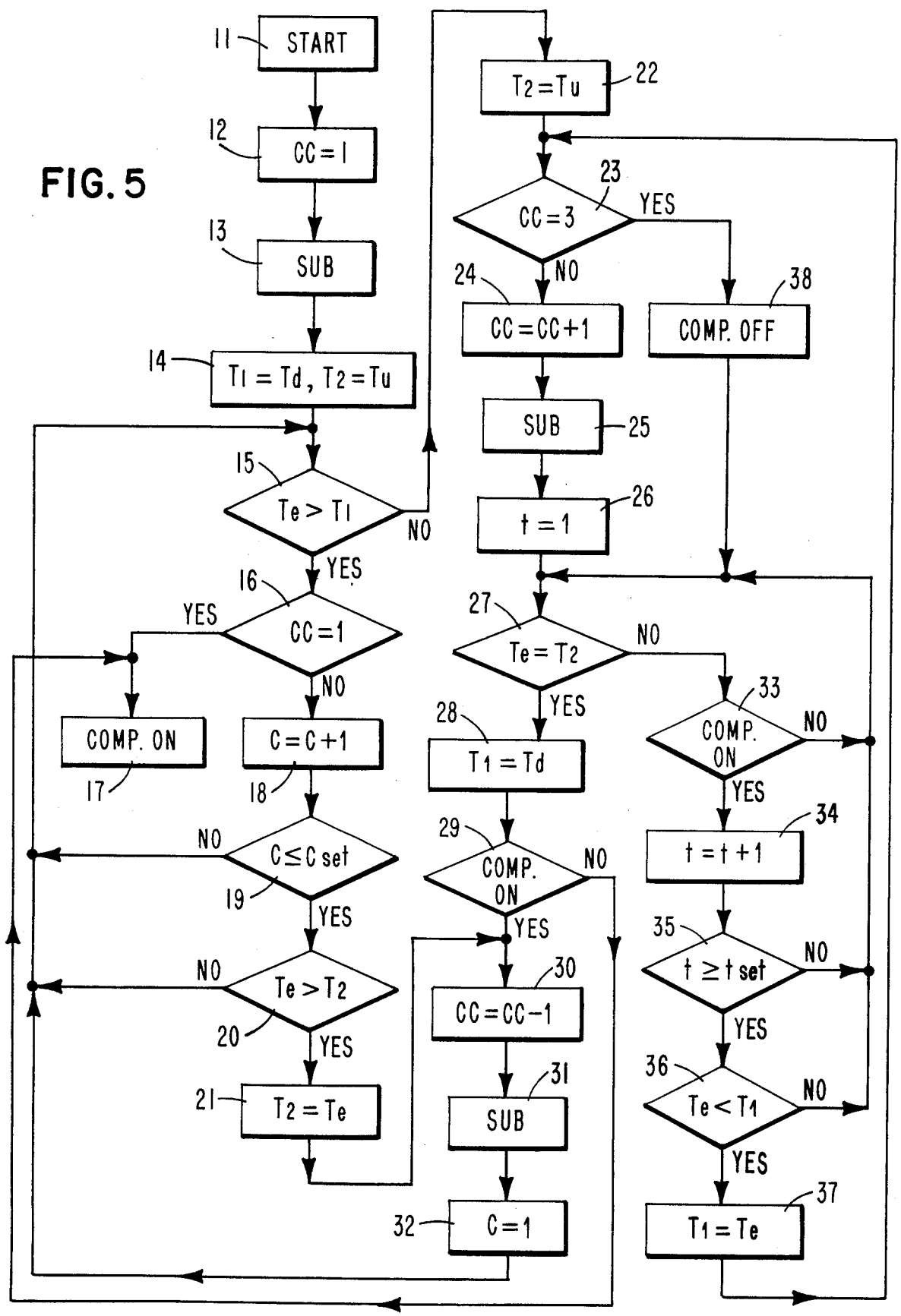
FIG. 5 is a flow chart illustrating the operation of the capacity control device of FIG. 3.
Figure 6:
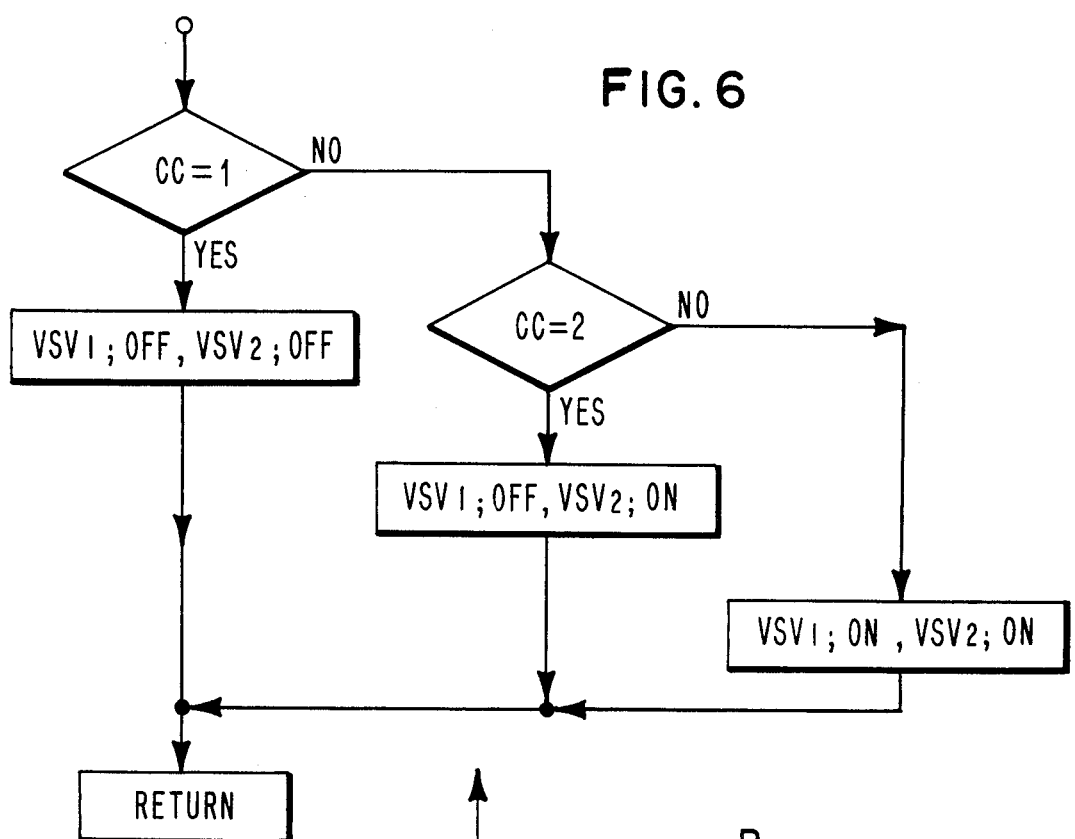
FIG. 6 is a flow chart illustrating the subroutine used in the flow diagram of FIG. 5.

Although the present invention has been described with reference to a control circuit comprising discrete components, as shown in FIG. 3, the underlying principles of the invention may also be implemented using a microprocessor selected from conventional microprocessors currently known in the art. A microprocessor based control circuit 10 will now be described with reference to the flow diagram shown in FIG. 5. When a main switch (not shown) is actuated to connect the voltage source at start step 11, control circuit 10 is ready for operation. Step 12 determines the compression volume of compressor 1, such as large volume $CC_1$, to which the air conditioning system will be initially set. After determining the initial compression volume, the operation of control circuit 10 proceeds to step 13 which is a subroutine for controlling solenoids $VSV_1$ and $VSV_2$ for actually setting the compression volume, as shown in FIG. 6. Step 14 sets lower predetermined temperature $T_1$ (=Td) which is the temperature at which variable displacement device 9 operates to reduce the compressor volume. Step 14 also sets higher predetermined temperature $T_2$ (=Tu) which is the operating temperature at which variable displacement device 9 operates to increase the volume of compressor 1.

After setting lower and higher temperature $T_1$ and $T_2$, respectively, the operation of control circuit 10 proceeds to step 15. At step 15, temperature Te of the air blown into the compartment is detected and compared with lower predetermined temperature Td from detecting circuit A of control circuit 10. If temperature Te is higher than lower predetermined temperature Td, operation of control circuit 10 proceeds to step 16 which determines the current volume of compressor 1. If the volume of compressor 1 is set to large volume $CC_1$, the operation of control circuit 10 proceeds to step 17 and compressor 1 continues to be driven with large volume $CC_1$. While Te remains higher than temperature Td, the operation of control circuit 10 continuously flows back through closed loop steps 15, 16, 17 and back to 15 to continue the operation of compressor 1 with large volume $CC_1$.

When temperature Te of the blown air is equal to lower predetermined temperature Td, the operation of control circuit 10 flows step 15 to steps 22 and 23. At step 23, the compression volume of compressor 1 is compared with the smallest volume $CC_3$ of compressor 1 and if the present volume of compressor 1 is larger than volume $CC_3$, step 23 flows to step 25 which operates to reduce the volume of compressor 1 through the operation of solenoids $VSV_1$ and $VSV_2$ of variable displacement device 9 by logic circuit B of control circuit 10. Step 24 flows to step 25 which is the same subroutine as shown in FIG. 6. After reducing the compression volume from large volume $CC_1$ to middle volume $CC_2$, step 25 flows to step 26 which operates the setting of the time delay used by circuit C of control circuit 10. At step 27, temperature Te of the blown air is detected and compared with higher predetermined temperature Tu. If temperature Te is lower than the predetermined temperature Tu, step 27 proceeds to steps 33 and 34. The operation of control circuit 10 then continuously flows back though closed loop steps 35, 27, 33 and 34 until the end of predetermined time delay t which is set in step 26. After time delay t, if temperature Te of the blown air has increased higher than predetermined temperature Tu, step 27 proceeds to steps 28, 29, 30, 31 and 32. In step 32, the compression volume of compressor 1 is returned to large volume $CC_1$ from middle volume $CC_2$ because the refrigerating capacity of compressor 1 with middle volume $CC_2$ is insufficient for the refrigeration load.

The above described flow chart explains the operation of temperature control circuit 10 when changing the compression volume to middle volume $CC_2$ from large volume $CC_1$ or to large volume $CC_1$ from middle volume $CC_2$. In control circuit 10, once predetermined time delay t, as set at step 26 is over during the closed loop of steps 35, 27, 33 and 34, step 35 proceeds to step 36. Step 36 compares the temperature Te of the blown air with the lower predetermined temperature Td. If temperature Te of the blown air is lower than predetermined temperature Td, step 36 proceeds to steps 37, 23 and 24 where the compression volume is reduced. If, however, temperature Te of the blown air is higher than lower predetermined temperature Td, step 36 flows back to step 27 and the compressor is driven with the present compression volume. In this situation, temperature Te of the blown air is maintained within a range between temperature $T_1$(Td) and $T_2$(Tu).

Compressor 1 is driven wih smaller volume $CC_3$ at step 25, and predetermined time delay t is set at step 26. During time delay t, the operation of control circuit 1 flows through closed loop steps 27, 33, 34, 35 and 27 to detect the change in temperature of the blown air, Te. When temperature Te increases above predetermined temperature Td, this indicates that the refrigerating capacity is insufficient for the refrigeration load, and the operation of control circuit 1 flows to steps 28, 29, 30 and 31, where smaller compression volume $CC_3$ is returned to middle volume $CC_2$ and then the operation proceeds to step 15. If temperature Te of the blown air is still lower than lower predetermined temperature Td, this indicates that the refrigerating capacity is higher than necessary for the refrigeration load and step 37 proceeds to steps 23 and 39. At step 39, the compressor is stopped by the operation of magnetic clutch 9 using logic circuit B in control circuit 10. However, if temperature Te of the blown air is higher than lower predetermined temperature Td, the operation of the compressor 1 is continued with smaller volume $CC_3$ due to the return to step 27.

The operation of step 37 temporarily replaces lower predetermined temperature Td. The changing of compression volume is started at the moment that the temperature Te of the blown air reaches lower predetermined temperature Td. After changing the volume, if the refrigerating capacity is higher than necessary, reduction of the temperature Te of the blown air is still continued so that another chaning point for operating the variable displacement device to reduce the compression volume must be set. The changing of compression volume is started at the moment temperature Te of the blown air reaches temperature Td-$\alpha$ which is lower than first determined temperature Td. Therefore, the refrigerating capacity of smaller volume $CC_3$ of compressor 1 must be compared with temperature Td-$\alpha$. If, in step 36, the control circuit detects that the refrigerating capacity of compressor 1 is higher, step 36 proceeds to step 37 to determine another lower predetermined temperature $T_1$. However, this temporary lower predetermined temperature will be set back to its primary temperature at step 28.

Furthermore, the operation of the compressor is stopped at step 38 and temperature Te of the blown air increases and the operation of the control circuit flows to closed loop steps 27, 33 and 37, and proceeds to closed loop steps 27, 28, 29 and 17. Therefore, operation of the compressor with a smaller volume $CC_3$ is controlled.

Figure 7:
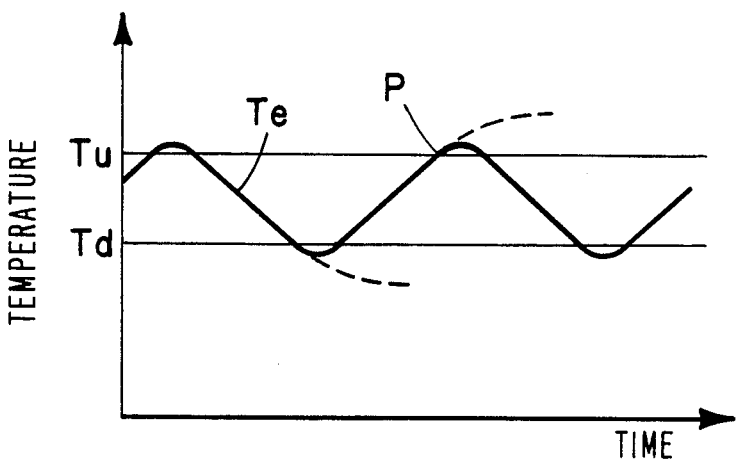
FIG. 7 illustrates the changes in temperature of the blown air in relation to time.

The operation of control circuit 10, particularly, its operation after step 18 will be described with reference to FIGS. 5 and 7. In FIG. 7, when the compressor is driven with middle volume $CC_2$ or smaller volume $CC_3$, the refrigerating capacity of compressor 1 is insufficient at point P by changing of operating conditions, for example, driving speed of compressor is reduced, the temperature of the blown air is increased as shown by the dotted line in FIG. 7. In this case, step 18 proceeds to step 19 which sets the timer mechanism to determine the predetermined time C to prevent the unnecessary changing of compression volume in order to prevent the blowing of warm air. Step 19 proceeds back to step 15 and to closed loop steps 15, 16, 18, 19, and 15. Since the operation flow after point 18 operates to increase the compression volume in the step 16, the compression volume of compressor 1 is detected. In step 16, if compressor 1 is driven with large volume $CC_1$, the operation flow after step 18 is prevented.

During the closed loop of steps 15, 16, 18, 19 and 15, predetermined time C is over, step 19 then proceeds to step 20 which compares temperature Te of the blown air with higher predetermined temperature Tu. At step 20, if temperature Te of the blown air is higher than higher predetermined temperature Tu, the refrigerating capacity of compressor 1 is insufficient for the refrigeration load and step 20 proceeds to steps 21, 30 and 31 where the refrigerating capacity of compressor 1 is increased at step 31.

The operation of step 21 has the same function as the step 27 and temporarily determined temperature $T_2$ is set back to its primary predetermined temperature, at step 22.

Figure 8:
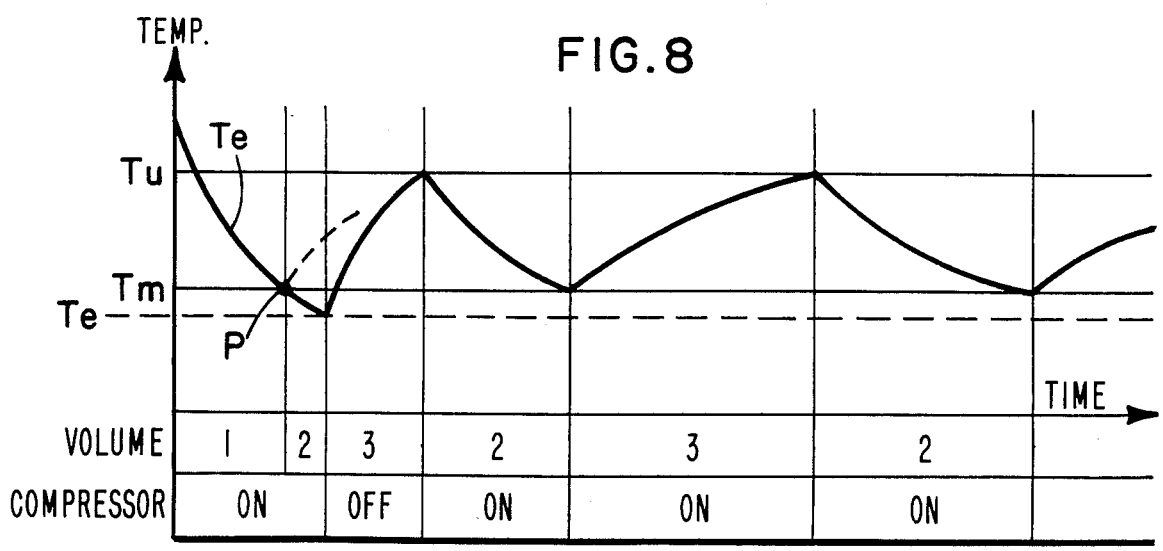
FIG. 8 illustrates the changes in temperature of the blown air in relation to compressor volume and time.

Referring to FIG. 8, another embodiment of the invention is shown. In this embodiment, control circuit 10 establishes three different temperatures; Tu, Tm and Te which are used to control the operation of magnetic clutch 9 and variable displacement device 8. The higher predetermined temperature Tu is the starting point of operation of magnetic clutch 9 and is also the point where compression volume is changed to a larger volume from a smaller volume. The middle predetermined temperature Tm is the changing point of the compression volume to a smaller volume from a larger volume and lower predetermined temperature Te is the stopping point of the operation of magnetic clutch 9 and also the changing point of compression volume to a smaller volume from a larger volume.

As shown in FIG. 8, temperature Te of blown air is decreased by the operation of the compressor, which has a large volume $CC_1$, and reaches middle predetermined temperature Tm (this state is shown at point P in FIG. 8). The compression volume of the compressor then changes to middle volume $CC_2$ from large volume $CC_1$. If the refrigerating capacity of compressor 1 is insufficient in comparison to the refrigeration load, temperature Te increases, as shown by the dotted line in FIG. 8. Therefore, the temperature Te keeps within the range of determined temperature Tu and Tm in order to change the volume of compressor 1 between large volume $CC_1$ and middle volume $CC_2$.

On the other hand, if refrigerating capacity of compressor 1 is higher than the refrigeration load, temperature Te decreases until it reaches lower predetermined temperature Te. The operation of compressor 1 is then stopped by the operation of magnetic clutch 9 and compression volume changes to small volume $CC_3$.

This invention has been described in detail in connection with preferred embodiments, but these are examples only and this invention is not restricted thereto. It will be easily understood by those skilled in the art that other variations and modifications can easily be made within the scope of this invention.

I claim:

1. A variable displacement control device for a compressor in an air conditioning system, said compressor including a variable displacement device to change the capacity of said compressor, said control device comprising:

a voltage source;

actuating means for actuating said variable displacement device; and control circuit means coupled to said voltage source and said actuating means for energizing said actuating means to actuate said variable displacement device to change the refrigeration capacity of said compressor, said control circuit means including evaluating means for evaluating the required refrigerating capacity of said refrigerating system and generating a control signal for actuating said variable displacement device to change the refrigerating capacity of said compressor between a small, medium and large volume as a funcion of the required refrigerating capacity of said air conditioning system, said evaluating means includes temperature detecting means for detecting the temperature of the air generated by the air conditioning system and providing first and second output signals generated by comparing the detected temperature to first and second predetermined temperature levels, said first and second output signals being coupled to counting means, wherein said counting means counts up in response to said first output signal when said second output signal is in a first state and counts down in response to said first output signal when said second output signal is in a second state, and timing means coupled to said counting means and said temperature detecting means for generating a third output signal a predetermined period after the generation of said first output signal, wherein said counting means counts up in response to said third output signal when said second output signal is in said first state and counts down in response to said third output signal when said second output signal is in said second state, said control signal being generated by the output of said counting means.

2. The control device of claim 1 wherein the control signal actuates said variable displacement device to change the refrigerating capacity of said compressor to a small volume when the required refrigerating capacity is small.

3. The control device of claim 2 wherein the control signal actuates said variable displacement device to change the refrigerating capacity of said compressor to a large volume when the required refrigerating capacity is large.

4. The control device of claim 1 wherein the temperature of the air generated by the air conditioning system is maintained between the first and second predetermined temperature levels.

5. The control device of claim 1 wherein the control signal actuates said variable displacement device to change the refrigerating capacity of said compressor to a lower volume when the detected temperature of the air generated by the air conditioning system is equal to or lower than the second predetermined temperature level.

6. The control device of claim 1 wherein the control signal actuates said variable displacement device to change the refrigerating capacity of said compressor to a higher volume when the detected temperature of the air generated by the air conditioning system is equal to or higher than the first predetermined temperature level.

7. The control device of claim 1 wherein said evaluating means is a microprocessor.

8. A capacity control device for a compressor is an air conditioning system, said compressor including a variable displacement device to change the capacity of said compressor, said control device comprising;

a voltage souce;

actuating means coupled to said voltage source for energizing said variable displacement device to change the capacity of said compressor in response to a control signal; and control circuit means for generating the control signal, said control circuit means including temperature detector means for providing a first output signal when the temperature of the cool air generated by the air conditioning system is at a first predetermined low temperature level and a second output signal when the temperature of the cool air is at a second predetermined high level, counting means coupled to said temperature detector means and responsive to the first and second output signals, said counting means counting up in response to the first output signal of said temperature detector means when said second output signal is in a first state and counting down in response to the first output signal of said temperature detector means when said second output signal is in a second state, timing means coupled to said counting means and said temperature detector means for generating a third output signal a predetermined period after the generation of said first output signal, wherein said counting means counts up in responsive to said third output signal when said second output signal is in said first state and counts down in response to said third output signal when said second output signal is in said second state, and logic circuit means coupled to the output of said counting means for generating the control signal to energize said actuating means to actuate said variable displacement device to change the capacity of said compressor as a function of the required refrigerating capacity of said air conditioning system.

9. The capacity control device of claim 8 wherein said temperature detector means includes first and second voltage comparators to generate the first and second output signals.

10. The capacity control device of claim 8 wherein said actuating means includes first and second valves controlled by said logic circuit means, said logic circuit means being responsive to the binary count of said counting means to generate a plurality of control signals for enabling said actuating means to change the capacity of said compressor from high capacity to low capacity and vice versa, said counting means being responsive to first and second output signals of said temperature detector means to generate two different binary counts.

11. The capacity control device of claim 10 wherein said temperature detector means includes first and second voltage comparators to generate the first and second output signals.

12. The capacity control device of claim 10 wherein said logic circuit means is responsive to the binary count of said counting means to generate a plurality of control signals for enabling said actuating means to change the capacity of said compressor from high to medium to low and vice versa.

* * * * *